United States Patent [19]

Park

[11] Patent Number: 5,657,093
[45] Date of Patent: Aug. 12, 1997

[54] VERTICAL FILTER CIRCUIT FOR PIP FUNCTION

[75] Inventor: Yung-jun Park, Kunpo, Rep. of Korea

[73] Assignee: Samsung Electronics Co., Ltd., Kyungki-do, Rep. of Korea

[21] Appl. No.: 497,719

[22] Filed: Jun. 30, 1995

[51] Int. Cl.[6] ....................................... H04N 7/01
[52] U.S. Cl. ................ 348/568; 348/458; 348/581
[58] Field of Search .................... 348/441, 443, 348/447, 448, 458, 568, 567, 566, 565, 563, 581; H04N 7/01, 5/45

[56] References Cited

U.S. PATENT DOCUMENTS

| | | | |
|---|---|---|---|
| 4,665,439 | 5/1987 | Naimpally | 348/458 |
| 4,768,093 | 8/1988 | Prodan | 358/160 |
| 5,065,243 | 11/1991 | Katagiri | 348/565 |
| 5,349,385 | 9/1994 | Glenn | 348/458 |
| 5,422,677 | 6/1995 | Do | 348/565 |

*Primary Examiner*—David E. Harvey
*Attorney, Agent, or Firm*—Sughrue, Mion, Zinn, Macpeak & Seas

[57] ABSTRACT

A vertical filter circuit providing a PIP function, which can be used for constructing a sub-screen when the input signal of a main screen is a double-scanned signal or a HDTV signal, compresses the vertical lines of the sub-screen into two-thirds of the original image. Preferably, the vertical filter includes an array of logical elements, a one line memory, two switches for signal routing and a control signal generator operating selected ones of the logical elements and the switches responsive to the horizontal and vertical sync signals.

10 Claims, 8 Drawing Sheets

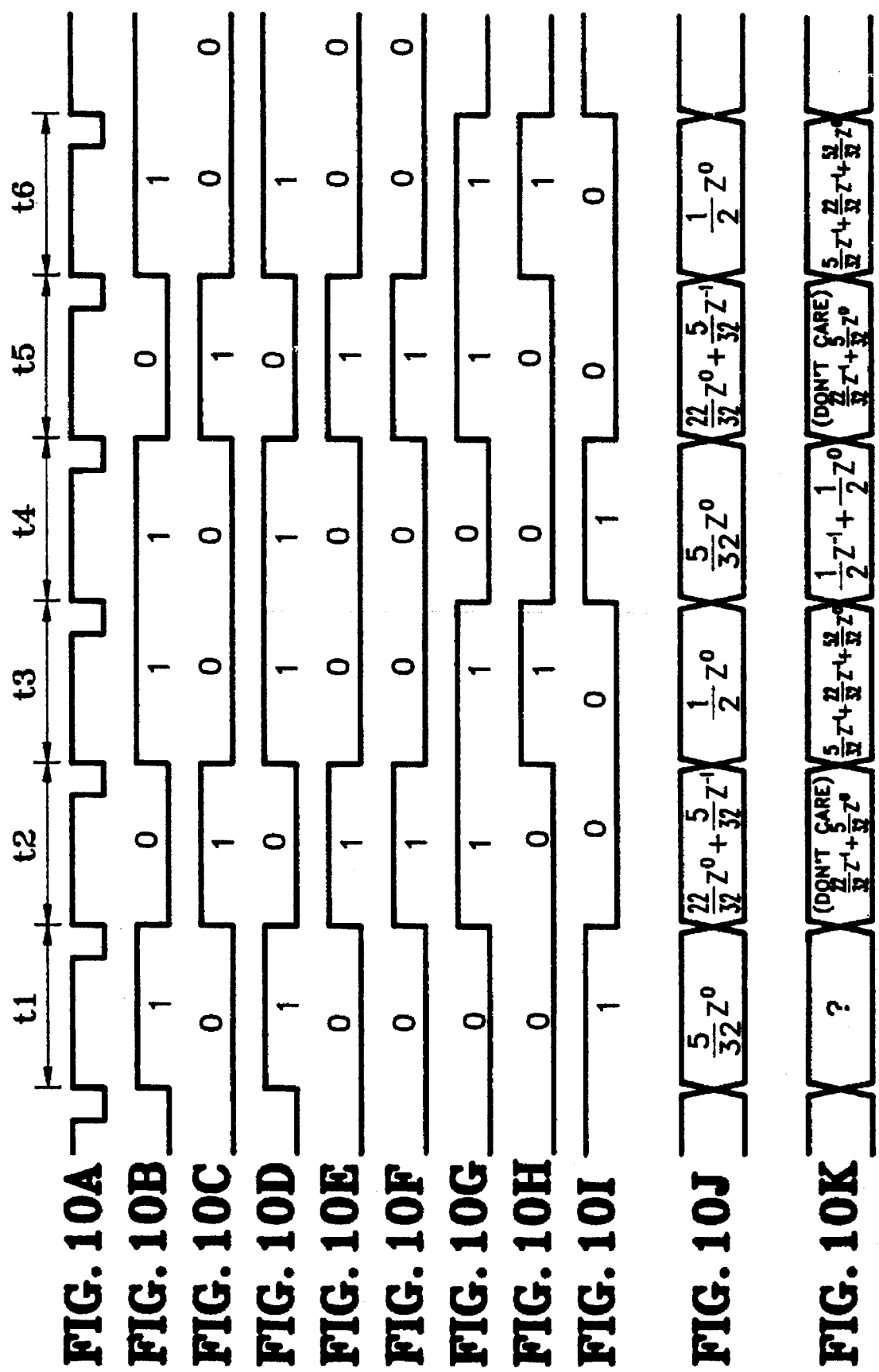

VERTICAL FILTER CIRCUIT FOR PIP FUNCTION

BACKGROUND OF THE INVENTION

1. Field of the Invention

This invention relates to a vertical filter circuit for a picture in picture (PIP) function and, more particularly, to a vertical filter circuit for constructing a sub-screen when the input signal of a main screen is a double-scanned signal or a HDTV signal.

2. Brief Discussion of Related Art

Generally, a PIP function is used for simultaneously displaying image signals of both the main screen and a sub-screen by horizontally and vertically compressing the sub-screen image signal. It will be appreciated that image signals of the same or different broadcasting channels may be displayed on the main and sub-screens. An image signal reproduced from an image recording/reproducing apparatus (VCR) be also displayed on the main screen, while the image signal of a broadcast channel can be displayed on the sub-screen with the size and position of the sub-screen being varied by a user.

The sub-screen for the PIP is processed as a digital signal. The data amount in the sub-screen of a predetermined size, i.e., a typical size ratio of sub-screen to main screen is 1 to 9, should be compressed into a predetermined amount corresponding to this ratio.

It will be noted that horizontal signal components of the sub-screen can be compressed into one third by setting the analog-to-digital (A/D) conversion clock frequency to one third of the digital-to-analog (D/A) conversion clock frequency. Moreover, vertical signal components of the sub-screen can be compressed into one third of the data amount of that of the main screen by reducing the number of scanning lines to one third. Accordingly, the data amount of the sub-screen can be compressed into one ninth of that of the main screen.

However, since a low sampling frequency is used for generating the abovedescribed sub screen, the video signal frequency must be restricted. Moreover, since the direction of the horizontal signal and the direction of the scanning line coincide with each other, the horizontal signal is continuous. To restrict the frequency band of the continuous signal, a low pass filtering must be performed before the A/D conversion. It will be noted that, when the vertical signal and the scanning line cross each other, the vertical signal becomes digitalized (discontinuous). The frequency band of this discontinuous signal cannot be restricted by present day analog technology. Therefore, to restrict the frequency band of the vertical signal, a digital filter called a vertical digital filter (hereinafter referred to as vertical filter) was designed. FIGS. 1 to 4F are useful in understanding the construction and operation of a typical vertical filter.

FIG. 1 illustrates a method for constructing the PIP sub-screen using a general interlace scanning signal. One line of PIP sub-screen data is generated for every third line of the image date per field.

A vertical filter is needed to remove or suppress a flicker phenomenon caused by a shortage in the number of vertical lines, i.e., so-called aliasing error. This is accomplished by restricting the frequency band of the discontinuous vertical signal. A high level diagram of the vertical filter is shown in FIG. 2, a more detailed example is shown in FIG. 3. This vertical filter technology used for providing PIP functions is described by Masashi Honzawa et al. in the article entitled "New Picture in Picture LSI Enhanced Functionality for High Picture Quality," in *IEEE Transaction on Consumer Electronics*, Vol. 36, No. 3, August, 1990.

Referring to FIG. 2, the vertical filter includes a three tap finite impulse response (FIR) filter adapted for vertical filtering and constructed using two 1H line memories 1 and 2, three multipliers 3, 4 and 5, and an adder 6. FIG. 3 illustrates a modified vertical filter. The modified filter uses only one 1H line memory 15 but performs the same function as the vertical filter circuit shown in FIG. 2. This is possible because only one significant line of the three lines of main screen data are necessary for compressing the sub-screen data.

The operation of the circuit shown in FIG. 3 will be described with respect to the waveforms shown in FIGS. 4A to 4F, wherein control signals CTL1 to CTL4 (shown in FIGS. 4B to 4E) are varied every third horizontal (H) period on the basis of the horizontal synchronous signal of FIG. 4A. These signals are supplied to AND gates 10, 11, 12 and 16 shown in FIG. 3. A final output signal of 1H line memory 15 can extract data $(h_2Z^{-2}+h_1Z^{-1}+h_0Z^0)$ every 3H period as shown in FIG. 4F.

The above-described vertical filter circuit can only be used for generating the PIP sub-screen when applied to a display device in which the main screen is generated by interlace scanning. When the input signal of main screen is a double-scanned signal or a HDTV signal, the number of scanning lines is increased by two, prohibiting use of the vertical filter.

U.S. Pat. No. 4,768,093 also discloses a vertical filter for PIP. This patent relates to a filter whose length is greater than a decimation factor in a television having a PIP function and which is applied to a general raster scan display device. However, both types of prior art filter cannot be applied to the double-scanned display device or HDTV.

SUMMARY OF THE INVENTION

The principal object of the present invention is to overcome the limitations of prior art vertical filters.

It is an object of the present invention to provide a vertical filter circuit for a PIP function, which can be used for constructing a sub-screen when the input signal of a main screen is a double-scanned signal or a HDTV signal.

Another object of the present invention is to provide a vertical filter circuit for a PIP function which has a simple circuit structure for removing the flicker phenomenon caused by a shortage in the number of the vertical lines in a sub-screen when the input signal of a main screen is a double-scanned signal or a HDTV signal.

These and other objects, features and advantages according to the present invention are provided by a vertical filter circuit for a PIP function, for generating a sub-screen when the input signal of a main screen is a double-scanned signal or a HDTV signal. Preferably, the vertical filter circuit incudes a line delaying device acting as means for delaying the input signal for 1H period, a first signal generator for generating a first horizontal line signal of the sub-screen by summing the signal of the first 2H period, passed through the line delaying device after multiplying the respective input signal which is selected by 1H every 3H period by predetermined coefficients, and a signal of a third horizontal line interval which is multiplied by a predetermined coefficient, a second signal generator for generating a second horizontal line signal of the sub-screen by summing the signal of the third horizontal line interval, passed through the line delaying device every 3H period, and the signal of next horizontal line interval, multiplied by a predetermined coefficient, and a control signal generator which is reset by a vertical synchronous signal and which generates a plurality of control signals by counting a horizontal synchronous signal as selection control signals of the first and second signal generators.

BRIEF DESCRIPTION OF THE DRAWINGS

The above objects and advantages of the present invention will become more apparent by reference to the attached drawings in which:

FIGS. 10A to 10K are waveforms of input and output signals of each portion of the vertical filter circuit shown in FIG. 9.

DETAILED DESCRIPTION OF PREFERRED EMBODIMENTS

When a main screen is compressed into a predetermined ratio (generally, in the ratio of one third vertically and horizontally, respectively) for constructing a PIP sub-screen, the compression method must be varied according to the compression direction, i.e., horizontal or vertical. That is, for horizontal compression, the compression is generally performed by lowering a sampling frequency after performing a low pass filtering at an analog signal band. For vertical compression, the compression is performed by selecting only a part of lines since the number of lines are fixed.

In the case where the input signal of the main and sub-screens are interlace scanning signals, e.g., NTSC signals, the number of vertical lines should be reduced to one third as described in the prior art, if the sub-screen whose area corresponds to one ninth of that of the main screen is desired. However, in the case where the input signal of the main screen is a double-scanned signal or HDTV signal, the number of vertical lines in the original screen should be reduced by two thirds since the number of lines should be halved in comparison with the interlaced scanning signal to reduce the area of sub-screen to one ninth of that of the main screen.

When the number of the vertical lines are reduced, an aliasing error is generated. Thus, a vertical low pass filtering process should be performed via the vertical filter circuit before reducing the number of vertical lines so as to remove the aliasing error.

Figure 1:
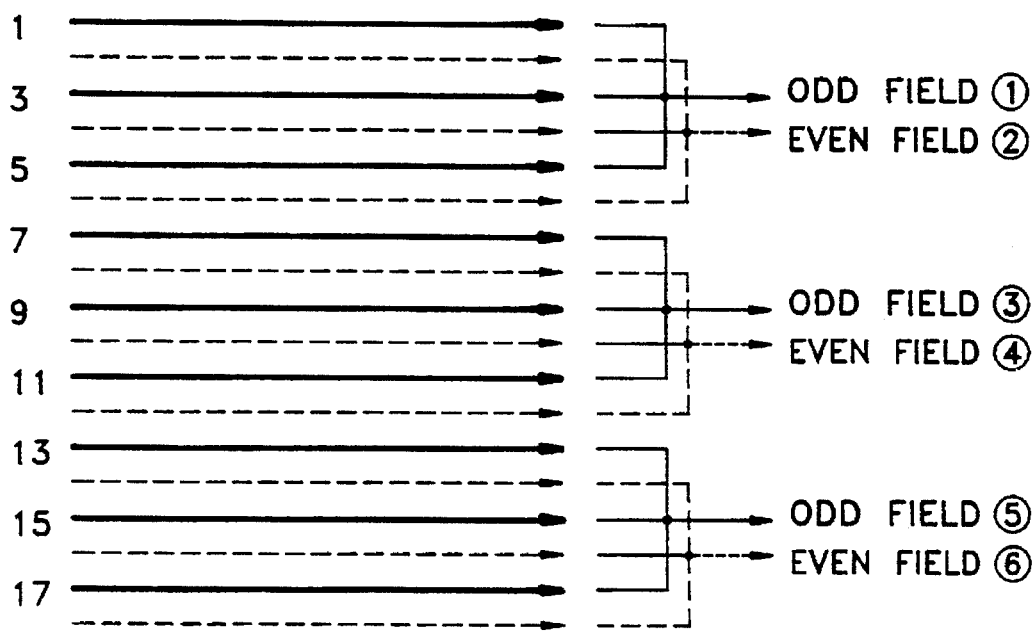
FIG. 1 is a diagram illustrating a method for constructing a PIP sub-screen by using a general interlace scanning signal.
Figure 2:
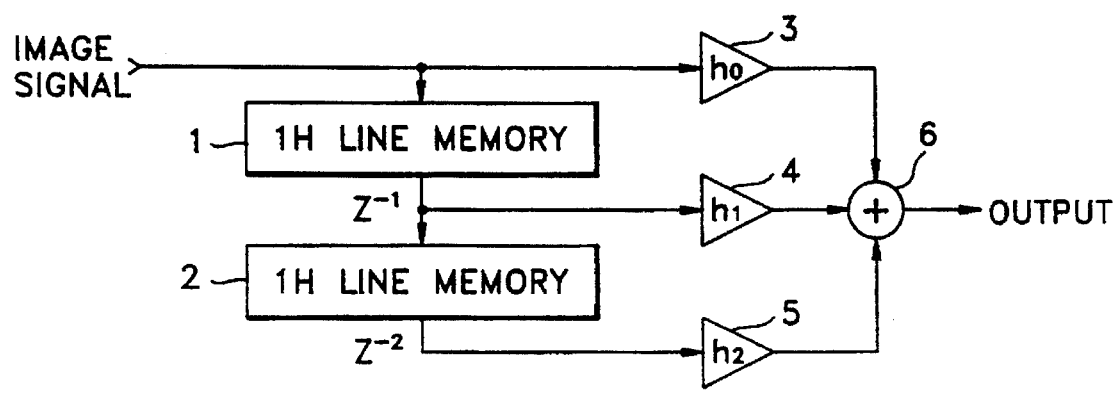
FIG. 2 is a diagram illustrating the concept of a vertical filter circuit for constructing a PIP sub-screen using the method shown in FIG. 1.
Figure 3:
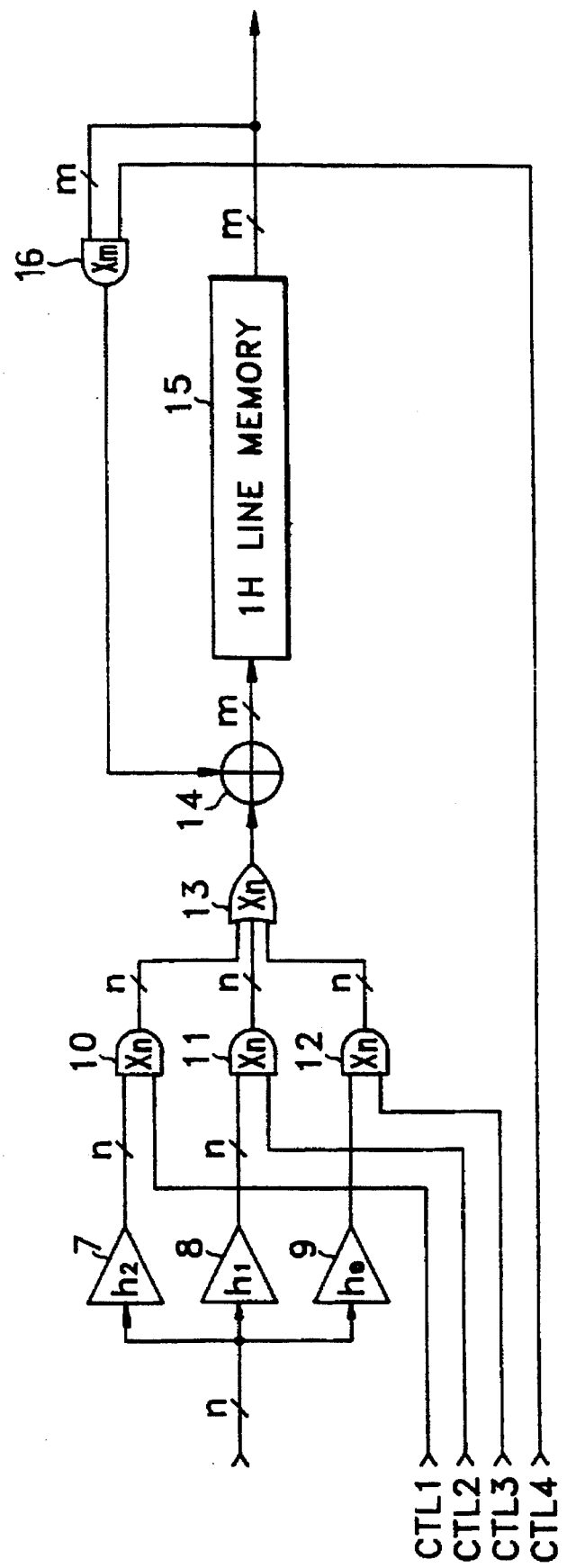
FIG. 3 is a block diagram showing a modified form of the vertical filter circuit shown in FIG. 2.
Figure 4A:
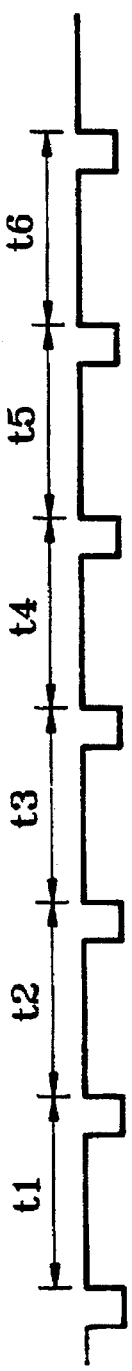
FIGS. 4A to 4F are waveforms of input and output signals of each portion of the vertical filter circuit shown in FIG. 3.
Figure 4B:
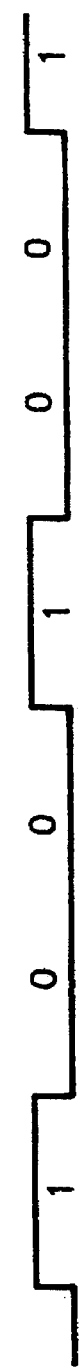
Figure 4C:
Figure 4D:
Figure 4E:
Figure 4F:
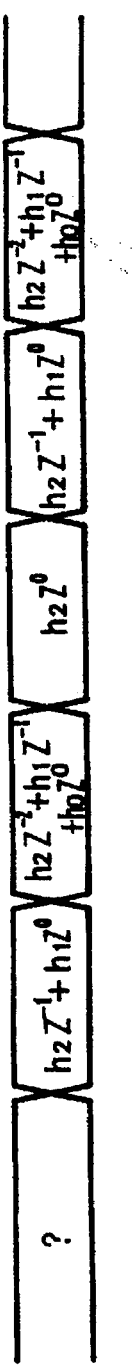
Figure 5:
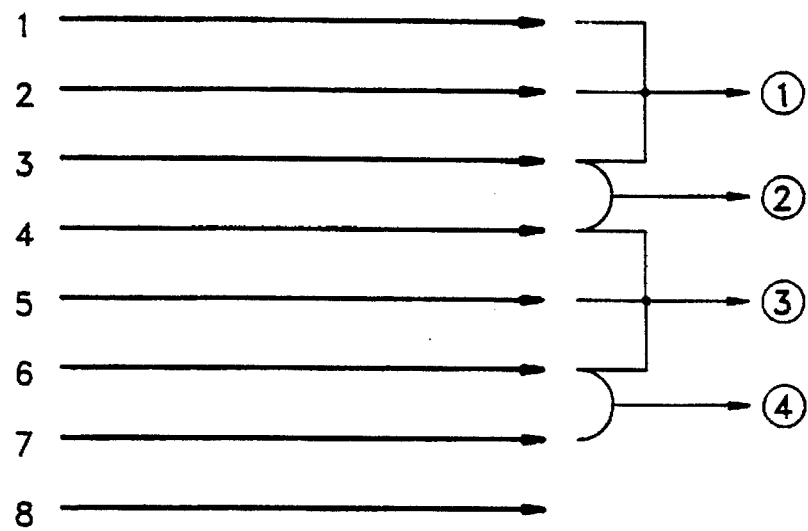
FIG. 5 is a diagram illustrating a general method for constructing a PIP sub-screen using a double-scanned signal or HDTV signal.

FIG. 5 is a diagram for illustrating a method for constructing a PIP sub-screen, wherein the input signal of the main screen is a double-scanned signal or HDTV signal. The PIP sub-screen for the double-scanning device or HDTV can be constructed by selecting two among three lines within one field.

To reduce the number of vertical lines to two-thirds, a low pass filtering should be performed every 3H period by constructing two different filters so as to obtain the output such as 1 and 2 shown in FIG. 5.

Figure 6:
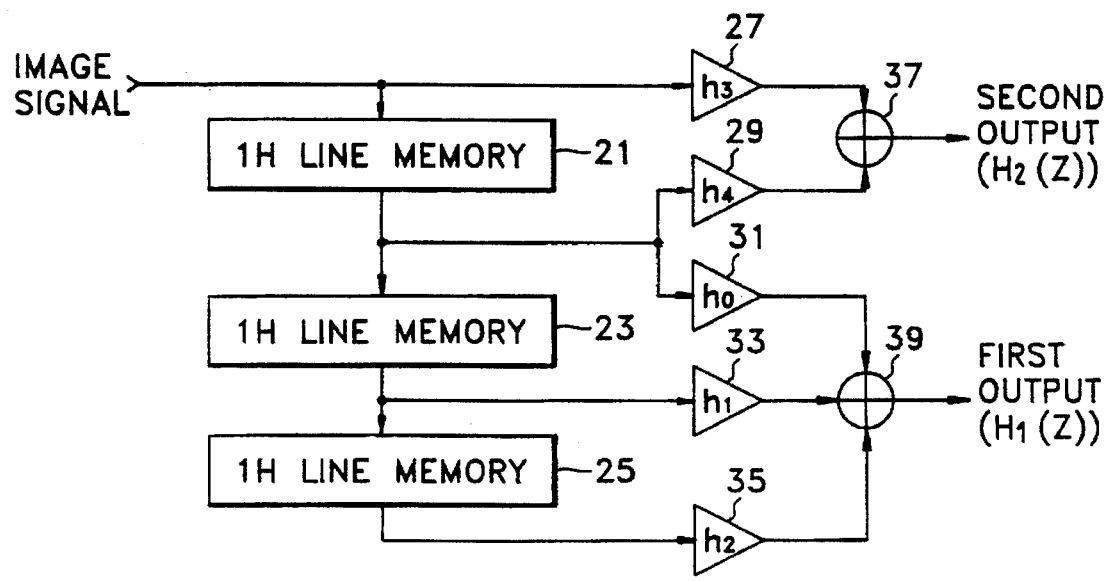
FIG. 6 is a diagram illustrating the concept of a vertical filter circuit for constructing a PIP sub-screen using the method shown in FIG. 5.

FIG. 6 is a diagram for illust,rating the concept of the vertical filter circuit for constructing the PIP sub-screen when the input signal of the main screen is a double-scanned signal or a HDTV signal. The circuit is composed of three line memories 21, 23 and 25, five multipliers 27, 29, 31, 33 and 35, and two adders 37 and 39.

Advantageously, 1H line memory 21, multipliers 27 and 29 and adder 37 compose a two tap filter, while 1H line memories 21, 23 and 25, multipliers 31, 33 and 35 and adder 39 compose a three tap filter. That is, when a first output $H_1(Z)$ and a second output $H_2(7)$ are repeatedly taken once every three lines, the output whose number of vertical lines is reduced to two thirds of the original screen can be obtained. Output $H_1(Z)$ has a transfer function characteristic shown in formula (1), i.e., output of the three tap filter, and output $H_2(Z)$ has a transfer function characteristic shown in formula (2), i.e., output of the two tap filter.

$$H_1(Z)=h_0Z^0+h_1Z^{-1}+h_2Z^{-2} \quad (1)$$

$$H_2(Z)=h_3Z^0+h_4Z^{-1} \quad (2)$$

However, since the vertical filter employs three 1H line memories 21, 23 and 25, it is difficult to create an integrated circuit (IC) without increasing the size of the hardware. Accordingly, the vertical filter circuit according to the present invention is designed to perform the same function as that of the circuit shown in FIG. 6 but using only one 1H line memory.

Figure 7:
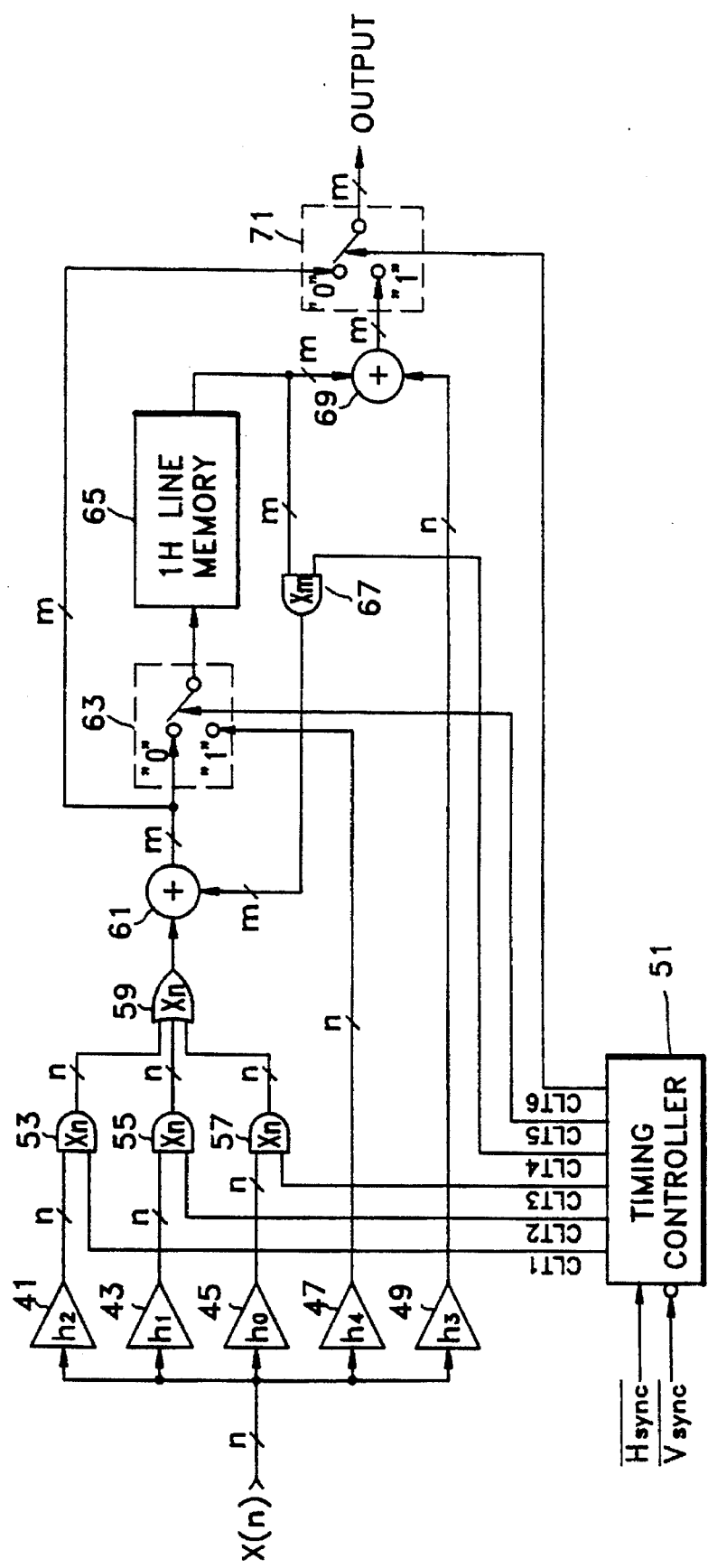
FIG. 7 is a circuit diagram of a vertical filter circuit for a PiP function according to a preferred embodiment of the present invention.

FIG. 7 is a circuit diagram of a vertical filter circuit for a PIP function according to a preferred embodiment of the present invention. The vertical filter circuit includes a timing controller 51, which is reset by a vertical synchronous signal/$V_{sync}$ and which generates the first to sixth clock signals CTL1 to CTL6. This is accomplished by counting a horizontal synchronous signal/$H_{sync}$. First to fifth multipliers 41, 43, 45, 47, and 49 multiply the input image signal by each of coefficients $h_2$, $h_1$, $h_0$, $h_4$ and $h_3$, respectively. First to third AND gates 53, 55 and 57 logically multiply the output signals of first to third multipliers 41, 43 and 45 by first to third control signals CTL1 to CTL3. Preferably, OR gate 59 logically sums the output signals of first to third AND gates 53, 55 and 57. 1H line memory 65 delays the input signal provided via a first adder 61 and/or a first switch 63 for 1H period. A fourth AND gate 67 logically multiplies CTL4 by the output signal of 1H line memory 65. First adder 61 sums the output signal of OR gate 59 and the output signal of fourth AND gate 67. First switch 63 selectively switches the output signal of first adder 61 or the output signal of fourth multiplier 47 according to CTL5 and outputs the result to 1H line memory 65. A second adder 69 sums the output signal of 1H line memory 65 and the output signal of fifth multiplier 49. A second switch 71 selectively switches the output signal of first adder 61 or the output signal of second adder 69 according to CTL6 and continuously outputs the three tap filter signal and two tap filter signal every 3H period.

Figure 8:
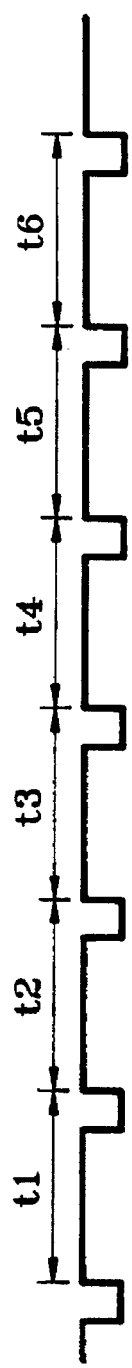
FIGS. 8A to 8I are waveforms of input and output signals of each portion of the vertical filter circuit shown in FIG. 7.

FIGS. 8A to 8I are waveforms of input and output signals of the vertical filter circuit shown in FIG. 7. FIG. 8A represents /$H_{sync}$ signal, FIGS. 8B to 8G represent control signals CTL1 to CTL6 output from timing controller 51, FIG. 8H represents the input signal of 1H line memory 65, and FIG. 8I represents the output signal of second switch 71.

The operation of the vertical filter circuit for a PIP function shown in FIG. 7 will be described with reference to the waveforms of FIGS. 8A to 8I. In FIG. 7, timing controller 51 is cleared by vertical synchronous signal/$V_{sync}$ and generates control signals CTL1 to CTL6 shown in FIG. 8B to FIG. 8G by counting horizontal synchronous signal/$H_{sync}$ shown in FIG. 8A.

First to third signals CTL1 to CTL3, shown in FIGS. 8B to 8D, are applied to the input terminals of first to third AND gates 53, 55 and 57, respectively. Control signal CTL4, shown in FIG. 8E, is applied to the input terminal of fourth AND gate 67. Control signal CTL5, shown in FIG. 8F, becomes a selection control signal of first switch 63. Control signal CTL6, shown in FIG. 8G, becomes a selection control signal of second switch 71.

In the first horizontal synchronous interval t1, shown in FIG. 8A, control signal CTL1, shown in FIG. 8B, is logical level "1", and control signals CTL2 and CTL3 shown in FIGS. 8C and 8D, are a logical level "0". Thus, the output of OR gate 59 is $h_2X(n)$, which is the output of first multiplier 41. Fourth and fifth control signals CTL4 and CTL5, shown in FIGS. 8E and 8F, are "0". Thus, first switch 63 selects the output of first adder 61 so that the input signal, shown in FIG. 8H, of 1H line memory 65 is $h_2X(n)$, which is the output of OR gate 59.

In the second horizontal synchronous interval t2, shown in FIG. 8A, control signal CTL2 is "1" and control signals CTL1 and CTL3 are "0" so that the output of OR gate 59 is hi, which is the output of second multiplier 43. Control signal CTL4 is "1" and control signal CTL5 is "0". Thus, first switch 63 selects the output of first adder 61 so that the input signal, shown in FIG. 8H, of 1H line memory 65 is the summed signal of $h_2X(n+1)$ 1H-delayed in 1H line memory 65 and $h_1X(n)$.

In the third horizontal synchronous interval t3, shown in FIG. 8A, control signal CTL3 is "1" and control signals CTL1 and CTL2 are "0". As a result, the output of OR gate 59 is $h_0X(n)$, which is the output of third multiplier 45. Control signal CTL4 is "1" so that the output of first adder 61 is the summed signal of $h_0X(n)$ and the summed signal of $h_2X(n+2)$ and $h_1X(n+1)$, which are 1H-delayed in 1H line memory. Control signal CTL6 is "0" so that second switch 71 selects the output of first adder 61, which can be expressed as a transfer function shown in FIG. 8I, that is, $h_0Z^0+h_1Z^{-1}+h_2Z^{-2}$. Control signal CTL5 is "1" so that first switch 63 selects the output signal of fourth multiplier 47. As a result, $h_4X(n)$, shown in FIG. 8H, is input to 1H line memory 65.

In the fourth horizontal synchronous interval t4, shown in FIG. 8A, control signal CTL5 is "0" and control signal CTL2 and CTL3 are "0". Therefore, the operation to the input terminal of 1H line memory 65 is the same as that in the first horizontal synchronous interval t1. That is, the input signal shown in FIG. 8H of 1H line memory 65 is $h_2X(n)$, the output of OR gate 59. On the other hand, control signal CTL6 is "1" so that second switch selects the output of second adder 69. Here, the output of second adder 69 is the summed signal of $h_4X(n+1)$ 1H-delayed in 1H line memory 65 and $h_3X(n)$. The output can be expressed as the transfer function shown in FIG. 8I, that is, $h_3Z^0+h_4Z^{-1}$.

In the fifth horizontal synchronous interval t5, shown in FIG. 8A, the output is the same as that in the second horizontal synchronous interval t2. In the sixth horizontal synchronous interval t6, shown in FIG. 8A, the output is the same as that in the third horizontal synchronous interval t3. The output has the transfer characteristic of $h_0Z^0+h_1Z^{-1}+h_2Z^{-2}$ every third horizontal line interval and of $h_3Z^0+h_4Z^{-3}$ for the next horizontal line interval. This is shown in FIGS. 8H and 8I.

Figure 9:
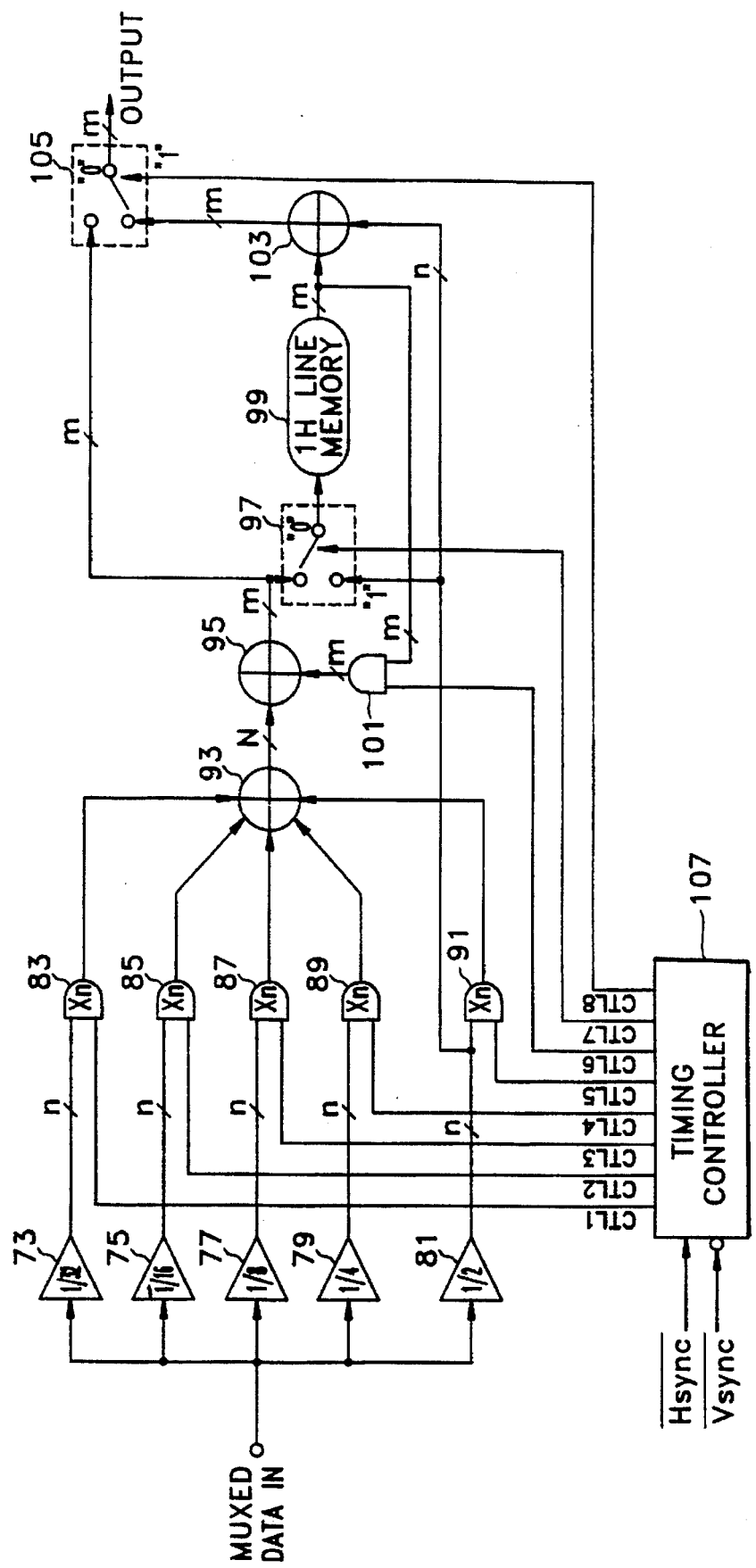
FIG. 9 is a circuit diagram of a vertical filter circuit for a PIP function according to another preferred embodiment of the present invention.

FIG. 9 is a circuit diagram of a vertical filter circuit for a PIP function according to another preferred embodiment of the present invention. More specifically, FIG. 9 illustrates a vertical filter circuit which is composed of first to fifth multipliers 73, 75, 77, 79 and 81 which multiply the input signal by respective predetermined coefficients. A timing controller 107, which is cleared by a vertical synchronous signal/$V_{sync}$, generates control signals CTL1 to CTL8. This is accomplished by counting horizontal synchronous signal/$H_{sync}$. First to fifth AND gates 83, 85, 87, 89 and 91 logically multiply the output signals of first to fifth multipliers 73, 75, 77, 79 and 81 by control signal CTL1 to CTL5. A first adder 93 logically sums the output signals of first to fifth and gates 83, 85, 87, 89 and 91. Preferably, 1H line memory 99 delays the input signal for 1H period. A sixth AND gates 101 logically multiplies the output of 1H line memory 99 by control signal CTL6. A second adder 95 sums the output signal of first adder 93 and the output signal of sixth AND gate 101. A first switch 97 selectively switches the output signal of a second adder 95 or the output signal of fifth multiplier 81 according to control signal CTL7 and outputs the result to 1H line memory 99. A third adder 103 sums the output signal of 1H line memory 99 and the output signal of fifth multiplier 81. A second switch 105 selectively switches the output signal of second adder 95 or the output signal of third adder 104 according to control signal CTL8.

FIGS. 10A to 10K are waveforms of input and output signals of the vertical filter circuit shown in FIG. 9. FIG. 10A represents /$H_{sync}$ signal, FIGS. 10B to 10I represent control signals CTL1 to CTL8 output from timing controller 107, FIG. 10J represents the input signal of 1H line memory 99, and FIG. 10K represents the output signal of second switch 105.

The operation of the vertical filter circuit for a PIP function shown in FIG. 9 according to a preferred embodiment of the present invention will be described with reference to FIGS. 10A to 10K. In FIG. 9, the coefficients of first to fifth multipliers 73, 75, 77, 79 and 81 are fixed as ½2, −¹⁄16, ⅛, ¼ and ½, respectively. Timing controller 107 generates control signals CTL1 to CTL8 (shown in FIGS. 10B to 10I) by counting horizontal synchronous signal/$H_{sync}$ (shown in FIG. 10A) and applies the result to each portion. Control signals CTL1 to CTL5 are applied to first to fifth AND gates 83, 85, 87, 87 and 91, respectively, and the output of the multipliers are output only through AND gates to which a "high" control signal is applied.

Control signal CTL6 is applied to the input terminal of sixth AND gate 101. Control signal CTL7 becomes the selection control signal of first switch 97 and control signal CTL8 becomes the selection control signal of second switch 105.

In the first horizontal synchronous interval t1 (shown in FIG. 10A), control signals CTL3 and CTL8 (shown in FIGS. 10B, 10D and 10I) are "1", and control signals CTL2, CTL4, CTL5, CTL6 and CTL7 (shown in FIGS. 10C, 10E to 10H)

are "0". Therefore, the input of 1H line memory 99 is the summed signal of the outputs of first and third AND gates 83 and 87, that is, $1/32X(n)+1/8X(n)$. The value is expressed as the transfer function of $5/32Z^0$.

In the second horizontal synchronous interval t2 control signals CTL4, CTL5 and CTL6 are "1" and control signals CTL1, CTL3, CTL7 and CTL8 are "0". Therefore, the input of 1H line memory 99 is the summed signal of the value of $5/32X(n+1)$, which is 1H-delayed and the outputs—$1/16X(n)$, $1/4X(n)$ and $1/2X(n)$ of second, fourth and fifth AND gates 85, 89 and 91. The value is expressed as the transfer function of $22/32Z^0+5/32Z^{-1}$.

In the third horizontal synchronous interval t3, control signals CTL1, CTL3, CTL6 and CTL7 are "1", and control signals CTL2, CTL4, CTL5 and CTL8 are "0". Therefore, the input of 1H line memory 99 is the output signal of fifth multiplier 81, that is, $1/2X(n)$. The value is expressed as the transfer function of $1/2Z^0$. The output $H_1(Z)$ of second switch 105 is a signal from second adder 95. That is, summed signal of the value of $22/32X(n+2)+5/32X(n+1)$, which is 1H-delayed, and the outputs $1/32X(n)$ and $1/8X(n)$ of first and third AND gates 83 and 87. The value can be expressed as the transfer function shown in formula (3).

$$H_1(z)=22/32Z^{-2}+5/32Z^{-1}+5/32Z^0 \tag{3}$$

In the fourth horizontal synchronous interval t4, the input of 1H line memory 99 is $5/32Z^0$, which is the same as that in the third horizontal synchronous interval, and the output $H_2(Z)$ of second switch 105 is a signal from third adder 103. This signal is the summed signal of the value of $1/2X(n+1)$, which is 1H-delayed, and the output $1/2X(n)$ of fifth AND gate 81. The value can be expressed as the transfer function shown in formula (4).

$$H_2(z)=1/2Z^{-1}+1/2Z^0 \tag{4}$$

In the fifth horizontal synchronous interval t5, the input of 1H line memory 99 is the same as that in the second horizontal synchronous interval t2. In the sixth horizontal synchronous interval t6, the input of 1H line memory 99 and the output of second switch 105 are the same as those in the third horizontal synchronous interval t3.

After the output of three tap .filter is output every 3H period, the output of two tap filter is output for the next horizontal synchronous interval.

According to the preferred embodiment shown in FIG. 7, when coefficients $h_0$ to $h_4$ of the multipliers 41, 43, 45, 47, and 49 are fixed to be proper for a system, the coefficients of first and second outputs $H_1(Z)$ and $H_2(Z)$ are fixed as predetermined values, as shown in formulas (1) and (2). However, according to a preferred embodiment shown in FIG. 9, when CTL1 to CTL6 output from the timing controller, the coefficients of first and second outputs shown in formulas (3) and (4) can be varied to be proper for the system.

As described above, the vertical filter circuit for a PIP function, according to the present invention, can be applied for constructing a sub-screen when the input signal of main screen is a double-scanned signal or a HDTV signal. This can be obtained by using one line memory, so that a flicker phenomenon, caused by a shortage in the number of the vertical lines in the sub-screen, can be avoided while the hardware can be simplified to thereby reduce manufacturing costs.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A vertical filter circuit providing a PIP function, and generating a sub-screen when an input image signal of a main screen is one of a double-scanned signal and a HDTV signal, comprising:

line delaying means for delaying an input signal supplied to said line delaying means for one horizontal line interval to thereby generate a delay output signal;

a first signal generator for generating a first horizontal line signal of the sub-screen by summing signals respectively corresponding to two horizontal line intervals, which have been passed through said line delaying means after multiplying the image signals, each of which is selected at each horizontal line interval in every period of three horizontal line intervals, by respective predetermined coefficients, and a signal corresponding to a third horizontal line interval which is multiplied by another one of said predetermined coefficients;

a second signal generator for generating a second horizontal line signal of the sub-screen by summing said signal corresponding to said third horizontal line interval, which has been passed through said line delaying means, and a signal corresponding to a next horizontal line interval, multiplied by another one of said predetermined coefficients; and a control signal generator, reset by a vertical synchronous signal, for generating a plurality of control signals by counting a horizontal synchronous signal as selection control signals of said first signal generator and said second signal generator.

2. The vertical filter circuit for a PIP function as claimed in claim 1, wherein said first signal generator comprises:

first to third multipliers for multiplying the input image signal by first through third predetermined coefficients, respectively;

first to third logical elements for selecting respective output signals of said first to third multipliers at each horizontal line interval in every period of three horizontal line intervals in response to first to third control signals;

a fourth logical element for receiving and logically summing output signals of said first to third logical elements;

a first adder for summing an output signal of said fourth logical element and a feedback signal, and providing a sum result to said line delaying means; and a fifth logical element for logically multiplying a fourth control signal output from said control signal generator by the delay output signal, and providing a result as said feedback signal.

3. The vertical filter circuit for a PIP function as claimed in claim 2, wherein said second signal generator comprises:

a fourth multiplier for multiplying the input image signal of the third horizontal line interval by a fourth one of said predetermined coefficients and providing a resultant signal to said line delaying means;

a fifth multiplier for multiplying the input image signal of the horizontal line interval next to said third horizontal line interval by a fifth one of said predetermined coefficients; and a second adder for summing the resultant signal which is output via said line delaying means and an output of said fifth multiplier.

4. The vertical filter circuit for a PIP function as claimed in claim 3, further comprising first switching means for selectively switching between the sum result of said first adder during the first two horizontal line intervals and the resultant signal of said fourth multiplier during a remaining horizontal line interval, in response to a fifth control signal generated from said control signal generator every three horizontal line intervals, and outputting a result to said line delaying means.

5. The vertical filter circuit for a PIP function as claimed in claim 3, further comprising second switching means for selectively switching between the sum result of said first adder and an output signal of said second adder in response to a sixth control signal generated from said control signal generator, and outputting said first horizontal line signal and second horizontal line signal of the sub-screen in every third horizontal line interval.

6. A vertical filter circuit for a PIP function, for generating a sub-screen when an input image signal of a main screen is one of a double-scanned signal and a HDTV signal, comprising:

line delaying means for delaying an input signal supplied to said line delaying means for one horizontal line interval;

a first signal generator for generating a first horizontal line signal of the sub-screen by summing a signals respectively corresponding to two horizontal line intervals, which have been passed through said line delaying means after multiplying a signal input every three horizontal line intervals by respective predetermined coefficients, and a signal of a third horizontal line interval which is multiplied by another one of said predetermined coefficients;

a second signal generator for generating a second horizontal line signal of the sub-screen by summing said signal of said third horizontal line interval, passed through said line delaying means every third line interval, and an associated signal of a next horizontal line interval, multiplied by another predetermined coefficient; and a control signal generator for outputting a plurality of control signals for varying outputs of said first signal generator and said second signal generator multiplied by respective predetermined coefficients so as to permit operation of said first signal generator and said second signal generator.

7. The vertical filter circuit for a PIP function as claimed in claim 6, wherein said first signal generator comprises:

first to fifth multipliers for multiplying the input image signal received every third horizontal line interval by first through fifth predetermined coefficients, respectively;

first to fifth logical elements for receiving respective output signals of said first to fifth multipliers in response to first to fifth control signals output from said control signal generator;

a first adder for summing output signals of said first to fifth logical elements;

a second adder for summing an output signal of said first adder and a feedback signal, and providing a result to said line delaying means; and a sixth logical element for providing a delay output signal of said line delaying means as said feedback signal in response to a sixth control signal generated from said control signal generator.

8. The vertical filter circuit for a PIP function as claimed in claim 7, wherein said second signal generator comprises a third adder for summing the output of said fourth multiplier, which corresponds to a vertical line signal every third line interval and output via said line delaying means, and the output of said fifth multiplier, which corresponds to a next horizontal line signal.

9. The vertical filter circuit for a PIP function as claimed in claim 7, further comprising first switching means for selectively switching between an output signal of said second adder during the first two horizontal line intervals and the output signal of said fifth multiplier during a remaining horizontal line interval, in response to a seventh control signal generated from said control signal generator every third horizontal line interval, and outputting a switched result to said line delaying means.

10. The vertical filter circuit for a PIP function as claimed in claim 8, further comprising second switching means for selectively switching between an output signal of said second adder and the output signal of said third adder in response to an eighth control signal generated from said control signal generator, and outputting continuous first and second horizontal line signals of the sub-screen every third horizontal line interval.

* * * * *